US008169986B2

(12) United States Patent
Jeong et al.

(10) Patent No.: US 8,169,986 B2
(45) Date of Patent: May 1, 2012

(54) METHOD AND APPARATUS FOR TRANSMITTING AND RECEIVING SYSTEM INFORMATION IN A MOBILE COMMUNICATION SYSTEM

(75) Inventors: Kyeong-In Jeong, Hwaseong-si (KR); Himke Van Der Valde, Middlesex (GB); Soeng-Hun Kim, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 958 days.

(21) Appl. No.: 12/027,542

(22) Filed: Feb. 7, 2008

(65) Prior Publication Data

US 2008/0205331 A1 Aug. 28, 2008

(30) Foreign Application Priority Data

Feb. 9, 2007 (KR) .......................... 10-2007-0013863

(51) Int. Cl.
*H04W 4/00* (2009.01)
*H04J 3/06* (2006.01)
(52) U.S. Cl. ...................... 370/338; 370/350; 455/422.1
(58) Field of Classification Search .................... 370/328
See application file for complete search history.

(56) References Cited

U.S. PATENT DOCUMENTS

| 6,449,290 | B1 * | 9/2002 | Willars et al. .................. 370/507 |
| 7,190,944 | B2 * | 3/2007 | Kim et al. ...................... 455/346 |
| 7,680,094 | B2 * | 3/2010 | Liu .................................. 370/350 |
| 7,796,549 | B2 * | 9/2010 | Grilli et al. ..................... 370/328 |
| 7,813,261 | B2 * | 10/2010 | Ma et al. ........................ 370/203 |
| 2002/0093940 | A1 * | 7/2002 | Toskala et al. ................. 370/350 |
| 2003/0061557 | A1 * | 3/2003 | Chao et al. ..................... 714/748 |
| 2003/0117997 | A1 * | 6/2003 | Kim ................................ 370/350 |
| 2007/0053339 | A1 * | 3/2007 | Peisa et al. ..................... 370/350 |
| 2007/0058595 | A1 * | 3/2007 | Classon et al. ................ 370/337 |
| 2007/0116094 | A1 * | 5/2007 | Parts et al. .................... 375/130 |
| 2010/0027526 | A1 * | 2/2010 | Bultan et al. .................. 370/350 |
| 2010/0034189 | A1 * | 2/2010 | Ranta ............................ 370/350 |
| 2010/0110983 | A1 * | 5/2010 | Fu ................................. 370/328 |

OTHER PUBLICATIONS

Motorola: "P-BCH Scheduling", 3GPP TSG-RAN WG2 Meeting #56, R2-063412, Nov. 6-10, 2006.
Samsung: "Transmission of Time Critical System Information", 3GPP TSG-RAN WG2 Meeting #57, R2-070674, Feb. 12-16, 2007.
Samsung: "Scheduling and Organisation of Flexible System Information", 3GPP TSG-RAN WG2 Meeting #56bis, R2-070168, Jan. 15-19, 2007.
NTT DoCoMo et al.: "Broadcast Channel Structure for E-UTRA Downlink", 3GPP TSG RAN WG1 LTE Ad Hoc, R1-061665, Jun. 27-30, 2006.
Samsung: "Combining of P-BCH", 3GPP TSG-RAN WG2#57, R2-070768, Feb. 12-16, 2007.
"Universal Mobile Telecommunications System (UMTS); Radio Resource Control (RRC); Protocol Specification, ETSI TS 125 331" vol. 3-R2, No. V7.3.0, Release 7, Dec. 2006.

* cited by examiner

*Primary Examiner* — Kenny Lin
*Assistant Examiner* — Guang Li
(74) *Attorney, Agent, or Firm* — The Farrell Law Firm, P.C.

(57) ABSTRACT

A method and apparatus for transmitting and receiving system information in a mobile communication system are provided, in which a System Frame Number (SFN) is transmitted as system information, and other system information, which excludes the SFN, is transmitted using resources different from resources used to transmit the SFN on a broadcast channel.

12 Claims, 13 Drawing Sheets

METHOD AND APPARATUS FOR TRANSMITTING AND RECEIVING SYSTEM INFORMATION IN A MOBILE COMMUNICATION SYSTEM

PRIORITY

This application claims priority under 35 U.S.C. §119(a) to a Korean Patent Application filed in the Korean Intellectual Property Office on Feb. 9, 2007 and assigned Serial No. 2007-13863, the entire disclosure of which is hereby incorporated by reference.

BACKGROUND OF THE INVENTION

1. Field of the Invention

The present invention generally relates to a mobile communication system. More particularly, the present invention relates to a method for efficiently broadcasting system information in a cell and a method for receiving the system information in a User Equipment (UE).

2. Description of the Related Art

The Universal Mobile Telecommunications System (UMTS) is a $3^{rd}$ Generation (3G) asynchronous mobile communication system operating in Wideband Code Division Multiple Access (WCDMA), based on European mobile communication systems, Global System for Mobile Communications (GSM) and General Packet Radio Services (GPRS). The $3^{rd}$ Generation Partnership Project (3GPP) that standardized UMTS is now discussing Long Term Evolution (LTE) as the next generation of UMTS, known as Evolved UMTS. The 3GPP LTE is a technology for enabling packet communications at or above 100 Mbps, aiming at commercialization by 2010. For deploying the LTE system, many communication schemes have been proposed. Among them are schemes of reducing the number of nodes on a communication line by simplifying a network configuration or of optimizing radio protocols for radio channels.

FIG. 1 is a diagram illustrating an Evolved UMTS system to which the present invention is applied.

Referring to FIG. 1, each of Evolved UMTS Radio Access Networks (E-UTRANs or E-RANs) 110 is simplified to a 2-node structure including Evolved Node Bs (ENBs) 120 and 122 and an anchor node 130, or ENBs 124, 126 and 128 and an anchor node 132. A User Equipment (UE) 101 is connected to an Internet Protocol (IP) network 114 via the E-UTRAN 110. The ENBs 120 to 128 correspond to legacy Node Bs in the UMTS system and are connected to the UE 101 via radio channels. Compared to the legacy Node Bs, the ENBs 120 to 128 play a more complex role. Since all user traffic including real-time service such as Voice Over IP (VoIP) is serviced on shared channels in the 3GPP LTE, an entity for collecting the status information of UEs and scheduling them is required and the ENBs 120 to 128 are responsible for the scheduling. Generally, an ENB controls a plurality of cells. Generally, the ENBs 120 to 128 perform Adaptive Modulation and Coding (AMC) by adaptively selecting a modulation scheme and a channel coding rate for a UE according to the channel status of the UE. As with High Speed Downlink Packet Access (HSDPA) and High Speed Uplink Packet Access (HSUPA) of UMTS (also referred to as Enhanced Dedicated CHannel (EDCH)), the LTE system uses Hybrid Automatic Repeat reQuest (HARQ) between the ENBs 120 to 128 and the UE 101. Considering that a variety of Quality of Service (QoS) requirements cannot be fulfilled with HARQ alone, a high layer may perform an outer ARQ between the UE 101 and the ENBs 120 to 128. HARQ is a technique for increasing reception success rate by soft-combining previous received data with retransmitted data without discarding the previous data. High-speed packet communication systems such as HSDPA and EDCH use HARQ to increase transmission efficiency. To realize a data rate of up to 100 Mbps, it is expected that the LTE system will adopt Orthogonal Frequency Division Multiplexing (OFDM) in a 20-MHz bandwidth as a radio access technology.

FIG. 2 illustrates system information broadcast in cells.

Referring to FIG. 2, reference numeral 201 denotes an ENB and reference numerals 211, 213 and 215 denote transmissions of system information from first, second and third cells, CELL #1, CELL #2 and CELL #3, respectively. The system information includes essential physical parameters and high-layer parameters common to UEs in a cell so that the UEs can receive a service in the cell. The physical parameters include, but are not limited to, the bandwidth of the cell, a Cyclic Prefix (CP) length, a physical channel configuration, the number of transmit antennas, and a System Frame Number (SFN), for example. The high-layer parameters may include a measurement Identifier (ID) and scheduling information about frequency or time resources in which other high-layer parameters are transmitted. A Primary Broadcast CHannel (P-BCH) carries the system information. To stably reach a cell boundary, the P-BCH needs a high transmit power or a robust Modulation and Coding Scheme (MCS) level.

FIG. 3 illustrates an exemplary method for transmitting system information.

Referring to FIG. 3, a 10-ms radio frame 301 includes ten subframes 303. It is assumed herein that a P-BCH carries system information in a 1.25-MHz subframe in every radio frame. As described before with reference to FIG. 2, to stably reach a cell boundary, the P-BCH carries a limited number of bits in a subframe. For example, a very low coding rate is applied to the P-BCH to achieve a 1% BLock Error Rate (BLER) for 98% of the cell coverage area and the P-BCH may deliver no more than 20 to 30 bits of information in a 1-ms subframe with a 1.25 MHz of bandwidth. The limitation on the number of P-BCH information bits makes it impossible to transmit all of the necessary system information on the P-BCH. If system information is ever managed to fit the allowed number of information bits, the system information size cannot be extended for the next transmission on the P-BCH. Accordingly, there is a need for a method for transmitting more information bits on the P-BCH in a given bandwidth.

SUMMARY OF THE INVENTION

An aspect of exemplary embodiments of the present invention is to address at least the problems and/or disadvantages described above and to provide at least the advantages described below. Accordingly, an aspect of exemplary embodiments of the present invention is to provide a method and apparatus for transmitting a greater number of information bits on a P-BCH with a predetermined bandwidth in a cell and a method and apparatus for receiving system information in a UE.

In accordance with an aspect of exemplary embodiments of the present invention, there is provided a method for transmitting system information in a mobile communication system, in which an SFN is transmitted as system information, and the other system information except for the SFN is transmitted in resources different from the resources that transmit the SFN on a broadcast channel.

In accordance with another aspect of exemplary embodiments of the present invention, there is provided a Node B apparatus for transmitting system information in a mobile communication system, in which an SFN manager increases an SFN, which is system information for every radio frame, a system information manager manages the other system information except for the SFN, a coder encodes the SFN received from the SFN manager and the other system information received from the system information manager, a controller controls transmission times of the SFN and the other system information and coding methods and coding rates used in the coder, and a transmitter transmits the SFN and the other system information in different resources.

In accordance with a further aspect of exemplary embodiments of the present invention, there is provided a method for receiving system information in a mobile communication system, in which an SFN being system information is received, and the other system information except for the SFN is received in different resources from resources of the SFN.

In accordance with still another aspect of exemplary embodiments of the present invention, there is provided a UE apparatus for receiving system information in a mobile communication system, in which a receiver receives an SFN and receives the other system information except for the SFN in different resources from resources of the SFN, a decoder decodes the SFN and the other system information, a controller controls decoding methods and decoding rates for the decoder, an SFN manager manages the decoded SFN, and a system information manager manages the decoded other system information.

In accordance with still further aspect of exemplary embodiments of the present invention, there is provided a method for transmitting system information in a mobile communication system, in which a reference SFN is transmitted as system information, for use in calculating an SFN, and an SFN offset is transmitted in resources different from resources of the reference SFN.

In accordance with yet another aspect of exemplary embodiments of the present invention, there is provided a Node B apparatus for transmitting system information in a mobile communication system, in which a system information manager manages a reference SFN for use in calculating an SFN, an SFN offset manager manages an SFN offset for use in calculating the SFN together with the reference SFN, a coder encodes the SFN offset received from the SFN offset manager and the reference SFN received from the system information manager, a controller controls transmission times of the SFN offset and the reference SFN and coding methods and coding rates used in the coder, and a transmitter transmits the SFN offset and the reference SFN in different resources.

In accordance with yet further aspect of exemplary embodiments of the present invention, there is provided a method for receiving system information in a mobile communication system, in which a reference SFN is received as system information, the reference SFN is used for calculating an SFN, and an SFN offset is received in resources different from resources of the reference SFN.

In accordance with yet still another aspect of exemplary embodiments of the present invention, there is provided a UE apparatus for receiving system information in a mobile communication system, in which a receiver receives a reference SFN and an SFN offset in different resources, the reference SFN and the SFN offset is used for calculating an SFN, a decoder decodes the SFN offset and the reference SFN, a controller controls decoding methods and decoding rates for the decoder, an SFN offset manager manages the decoded SFN offset, and a system information manager manages the decoded reference SFN.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as detailed constructions and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While exemplary embodiments of the present invention will be described in the context of a 3GPP LTE system evolved from a 3GPP UMTS system, it is to be clearly understood that the present invention is applicable to other mobile communication systems as well.

Figure 1:
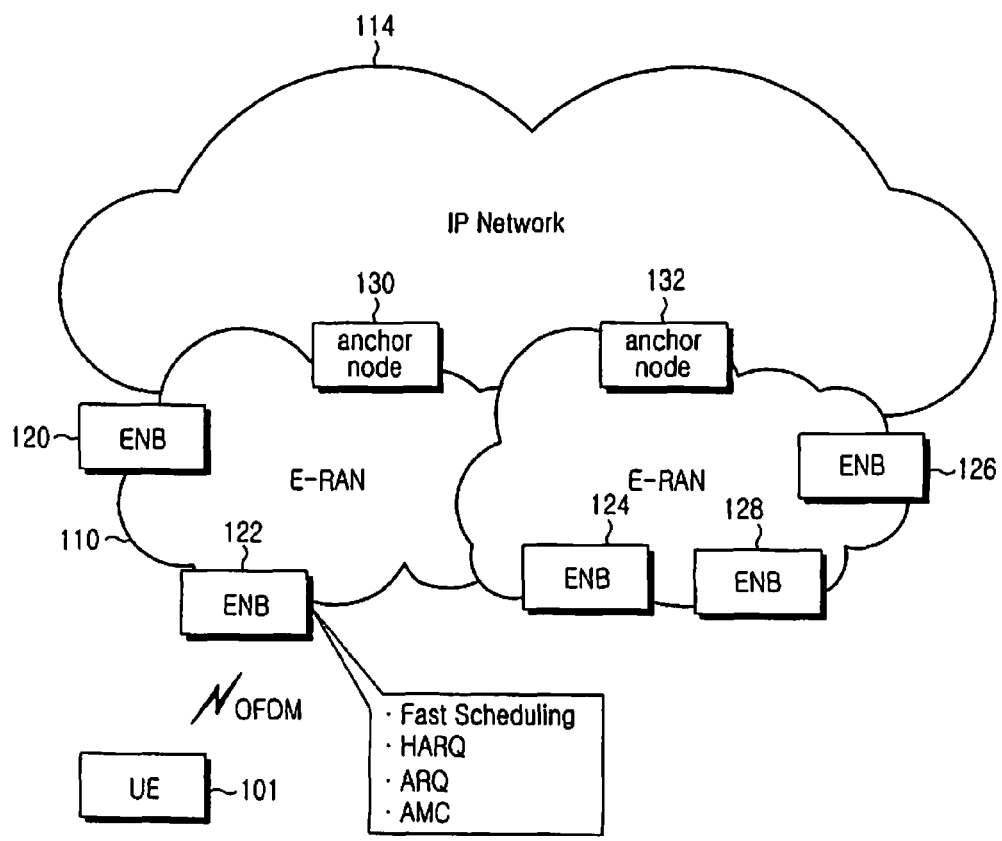
FIG. 1 illustrates a 3GPP LTE system according to an exemplary embodiment of the present invention.
Figure 2:
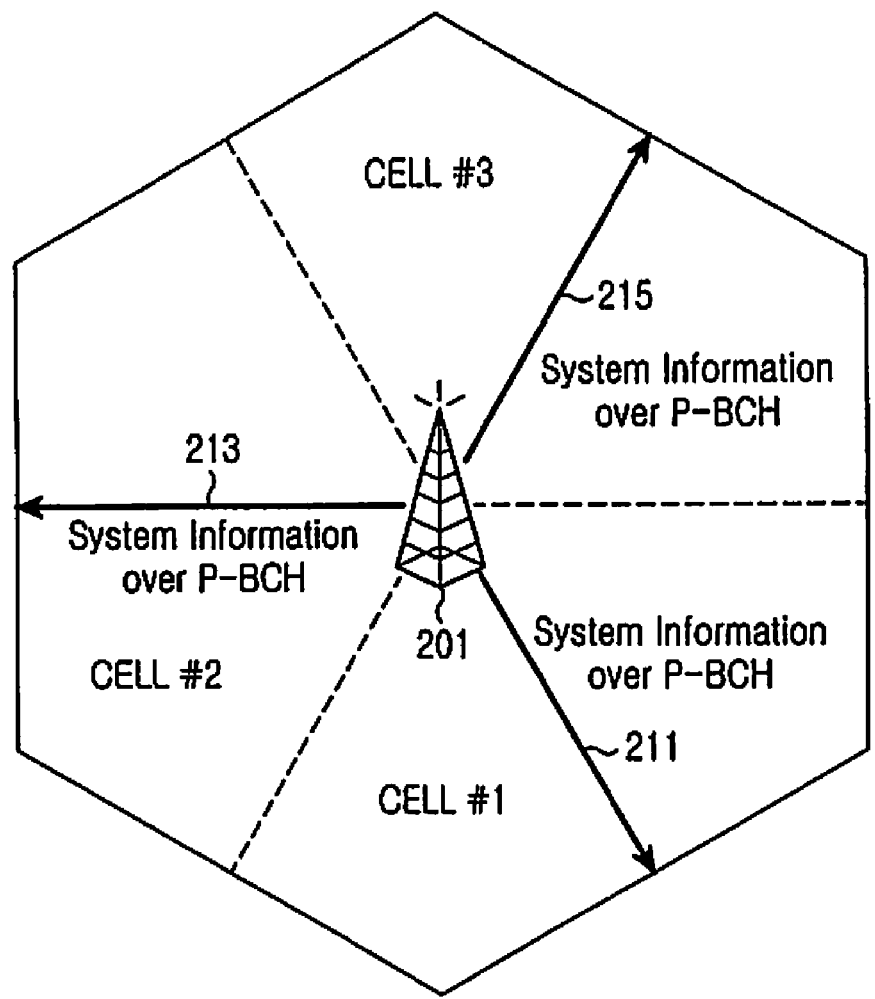
FIG. 2 illustrates system information broadcast in cells.
Figure 3:
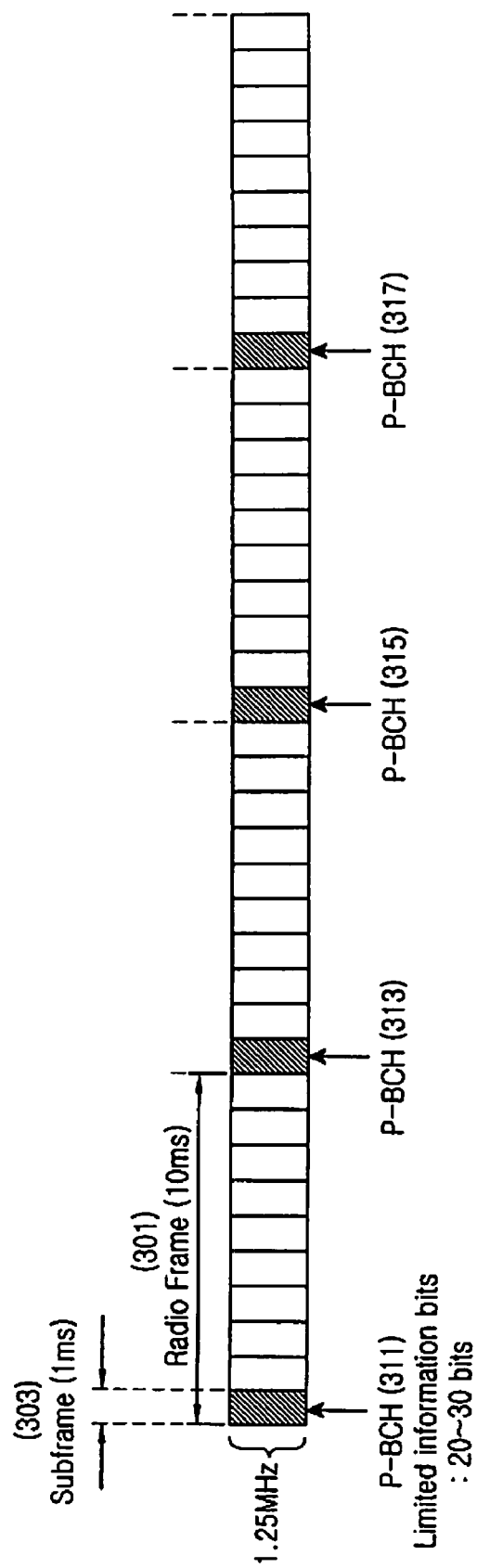
FIG. 3 illustrates an exemplary method for transmitting system information.
Figure 4:
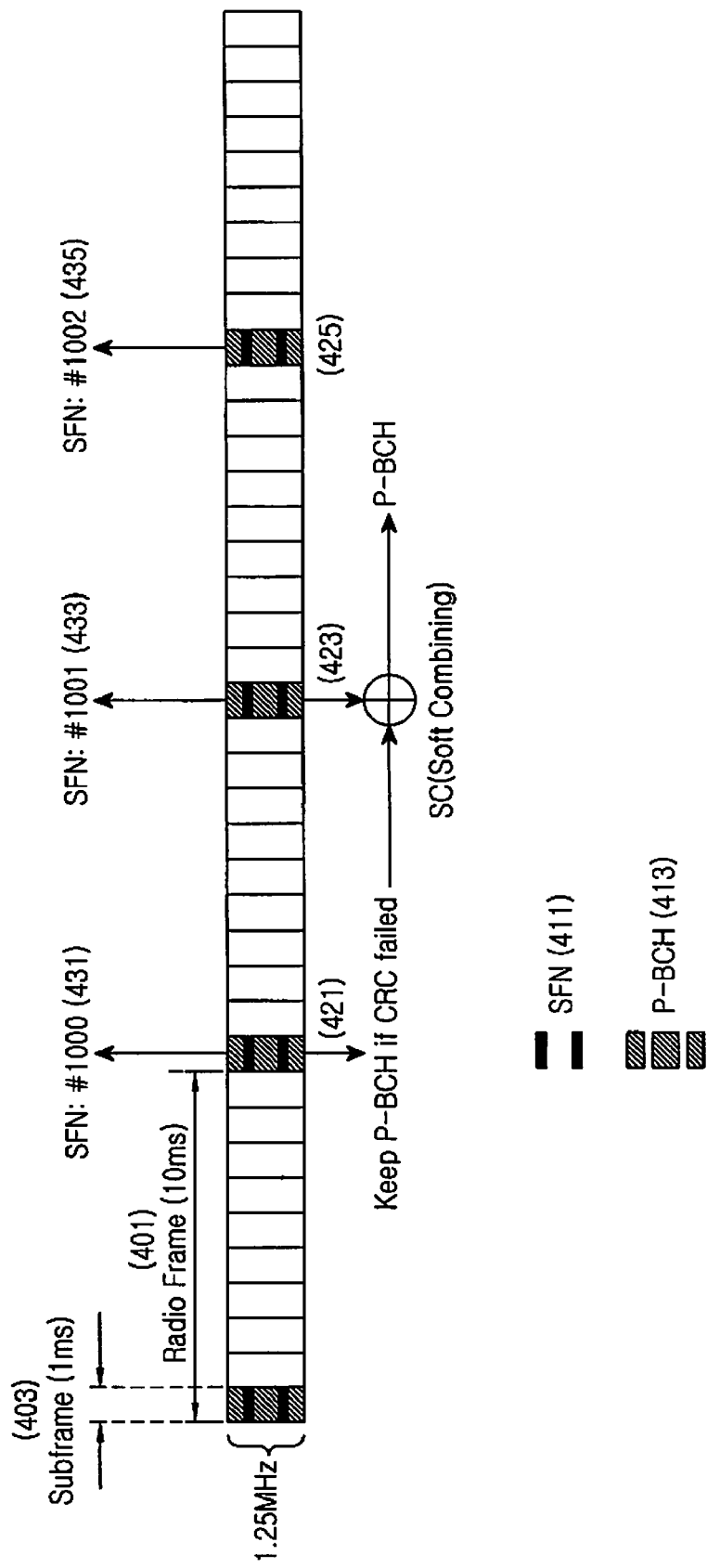
FIG. 4 is a diagram illustrating a method for transmitting system information and a method for receiving the system information in a UE according to an exemplary embodiment of the present invention.

FIG. 4 is a diagram illustrating a method for transmitting system information and a method for receiving the system information in a UE according to an exemplary embodiment of the present invention.

Referring to FIG. 4, it is assumed herein that a 10-ms radio frame 401 includes ten subframes 403 and a P-BCH carries system information in a 1.25-MHz subframe of every radio frame. Reference numeral 411 denotes an SFN encoded in a predetermined coding scheme and transmitted in predetermined resources of the 1.25-MHz subframe. The resources can be frequency resources, a scrambling code, or the like. Reference numeral 413 denotes P-BCH information that has the same value during a P-BCH transmission period other than the SFNs. The P-BCH information 413 is encoded in a different coding scheme/coding rate from that of the SFN 411 and transmitted in different resources from those of the SFN 411 in the 1.25 MHz subframe.

If a UE receives system information from an ENB at a P-BCH transmission time 421, the UE acquires an SFN 431, SFN #1000, and the P-BCH information 413 by decoding and interpreting the system information in predetermined resources of 1.25 MHz (i.e. SFN transmission resources and other P-BCH transmission resources) according to a predetermined method. If the UE fails to receive the P-BCH information 413 at the P-BCH transmission time 421, that is, the P-BCH information 413 turns out to have errors in a Cyclic Redundancy Check (CRC) check, the UE stores the P-BCH information 413 in a buffer, receives the P-BCH information 413 at the next P-BCH transmission time 423, and combines the stored P-BCH information 413 with the received P-BCH information 413.

The UE checks the continuity of SFNs received and decoded/interpreted at the P-BCH transmission times 421 and 423, to thereby detect and correct reception errors in the SFNs if there are any reception errors. For instance, if the SFNs are #1000 and #1001, they are successive, which implies successful reception of the SFNs 431 and 433. Thus, the UE applies the SFNs, considering that the SFNs have been successfully acquired. On the other hand, if the SFNs are not successive (e.g. #1000 and #1200), the UE receives an SFN 435 at the next P-BCH transmission time 425 and detects and corrects reception errors in the SFNs. If the SFN 435 is #1002, the UE determines that SFN #1200 received at the P-BCH transmission time 423 is wrong and corrects the SFN to #1001.

Figure 5:
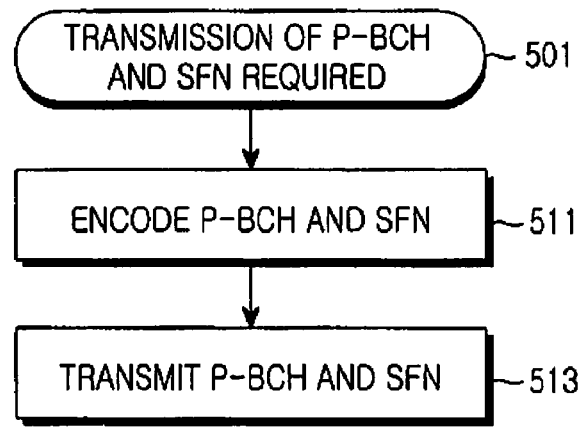
FIG. 5 is a flowchart of an operation of an ENB according to the exemplary embodiment of the present invention.

FIG. 5 is a flowchart of an operation of an ENB according to the exemplary embodiment of the present invention.

Referring to FIG. 5, when determining to transmit P-BCH information and an SFN in step 501, the ENB encodes the P-BCH information and the SFN in predetermined coding methods/coding rates in step 511 and transmits the encoded P-BCH information and SFN in respective predetermined frequency/time resources in step 513. Considering that a UE will combine the P-BCH information, the ENB transmits the P-BCH at a lower transmit power level or using an appropriate MCS level so that the P-BCH can carry more information bits.

Figure 6:
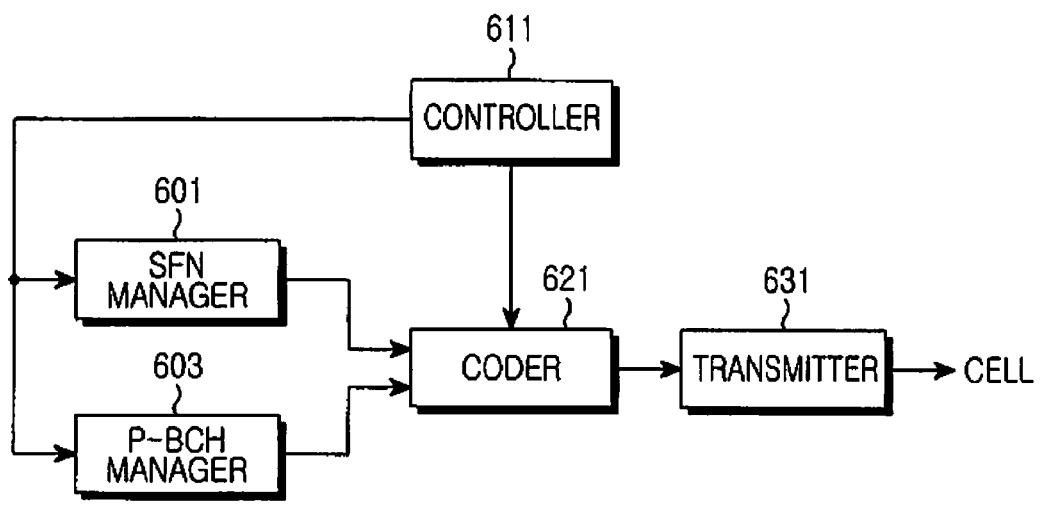
FIG. 6 is a block diagram of an ENB apparatus according to the exemplary embodiment of the present invention.

FIG. 6 is a block diagram of an ENB apparatus according to the exemplary embodiment of the present invention.

Referring to FIG. 6, an SFN manager 601 is a function block for controlling and managing SFNs. The SFN manager 601 increases an SFN every radio frame. A P-BCH manager 603 controls and manages P-BCH information other than the SFNs. A coder 621 encodes the SFNs and the P-BCH information at predetermined respective coding rates according to predetermined respective coding methods. A controller 611 controls transmission timings of the SFNs and the P-BCH information from the SFN manager 601 and the P-BCH manager 603 and controls the coding methods and coding rates of the coder 621. A transmitter 631 transmits the coded SFNs and the P-BCH information received from the coder 621 to a cell.

Figure 7:
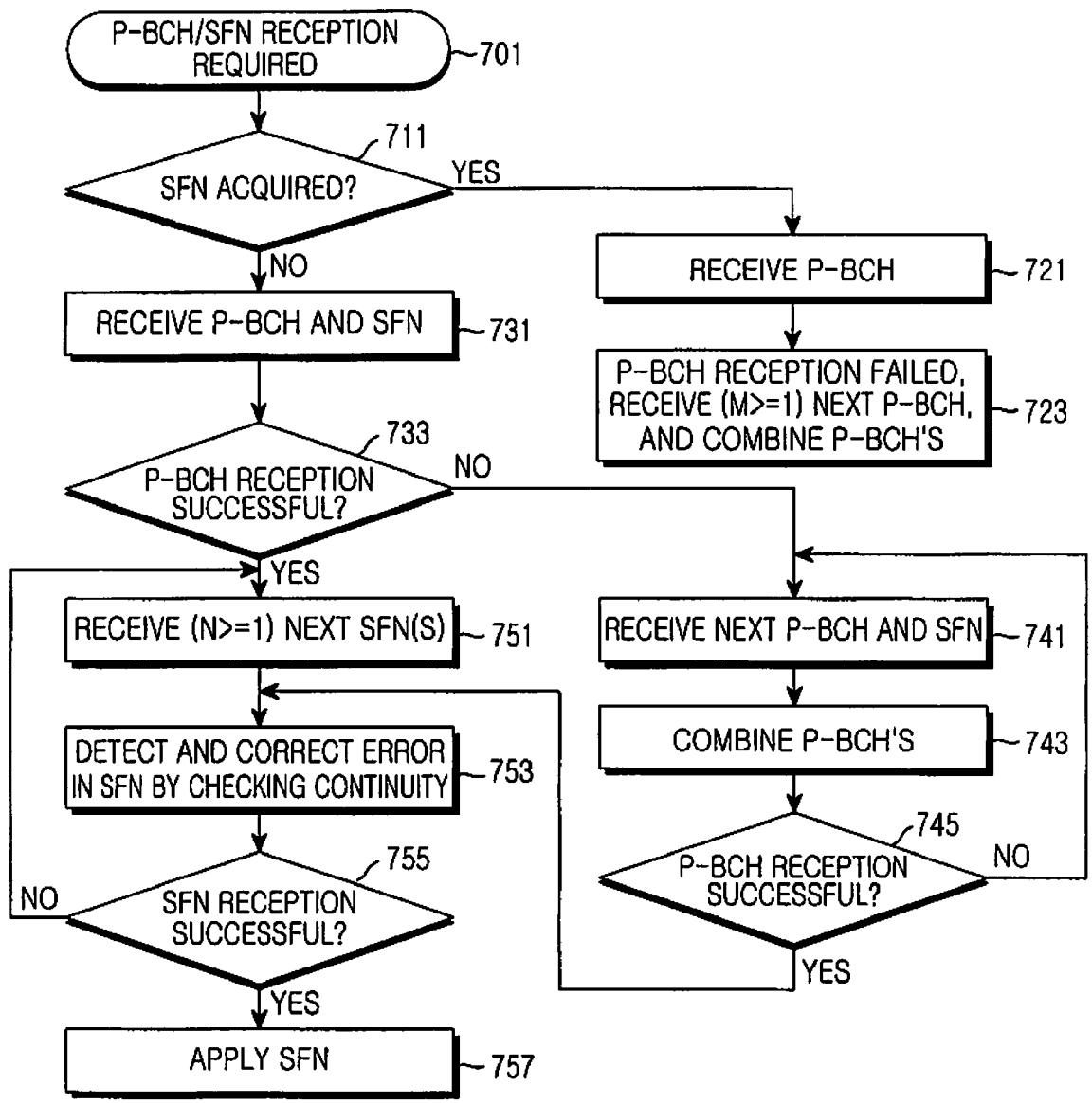
FIG. 7 is a flowchart of an operation of the UE according to the exemplary embodiment of the present invention.

FIG. 7 is a flowchart of an operation of the UE according to the exemplary embodiment of the present invention.

Referring to FIG. 7, when determining that an SFN or P-BCH information needs to be received in step 701, the UE determines in step 711 whether SFN information of a serving cell has been acquired. If the SFN information has not been acquired, the UE receives in step 731 an SFN and P-BCH information in predetermined respective resources using predetermined respective coding methods/coding rates.

In step 733, the UE determines whether the P-BCH information has been successfully received by such as CRC error. If the P-BCH information has been successfully received, the UE receives in step 751 N SFNs (N>=1) in next P-BCH transmission period and detects and corrects in step 753 SFN reception errors by checking the continuity of the received SFNs. For example, for N=1, if the SFN received in step 731 is SFN #1000 and the SFN received in step 751 is SFN #1001, the UE determines that the SFN information has been successfully acquired because the SFNs are successive. For N=2, if the SFN received in step 731 is SFN #1000 and the SFNs received in step 751 are SFN #1200 and SFN #1002, the UE determines that SFN #1200 is incorrect and corrects this SFN to #1001.

In step 755, the UE checks the continuity of ordered SFNs resulting from step 753 and determines whether the SFN information has been successfully received. If the ordered SFNs are successive, the UE applies in step 757 the SFNs, considering that the SFN information has been successfully acquired. If it is determined in step 755 that the SFN information acquisition has been failed, the UE returns to step 751 and repeats 751 to 755.

If a CRC has occurred to the P-BCH information in step 733, the UE receives in step 741 an SFN and P-BCH information in the next transmission period and combines in step 743 the received P-BCH information with P-BCH information received in a previous transmission period. In step 745, the UE checks the result of the combining. If the combining result tells that the P-BCH information has been successfully received (i.e. without a CRC error), the UE goes to step 753. If the reception of the P-BCH information failed (i.e. a CRC error has occurred), the UE returns to step 741.

If the UE has already acquired the SFN information of the cell in step 711, the UE receives in step 721 only P-BCH information in predetermined resources using a predetermined coding method and coding rate. If the UE has failed to receive the P-BCH information successfully, in step 723 the UE receives P-BCH information in the next transmission period and combines the received P-BCH information with previous P-BCH information.

Figure 8:
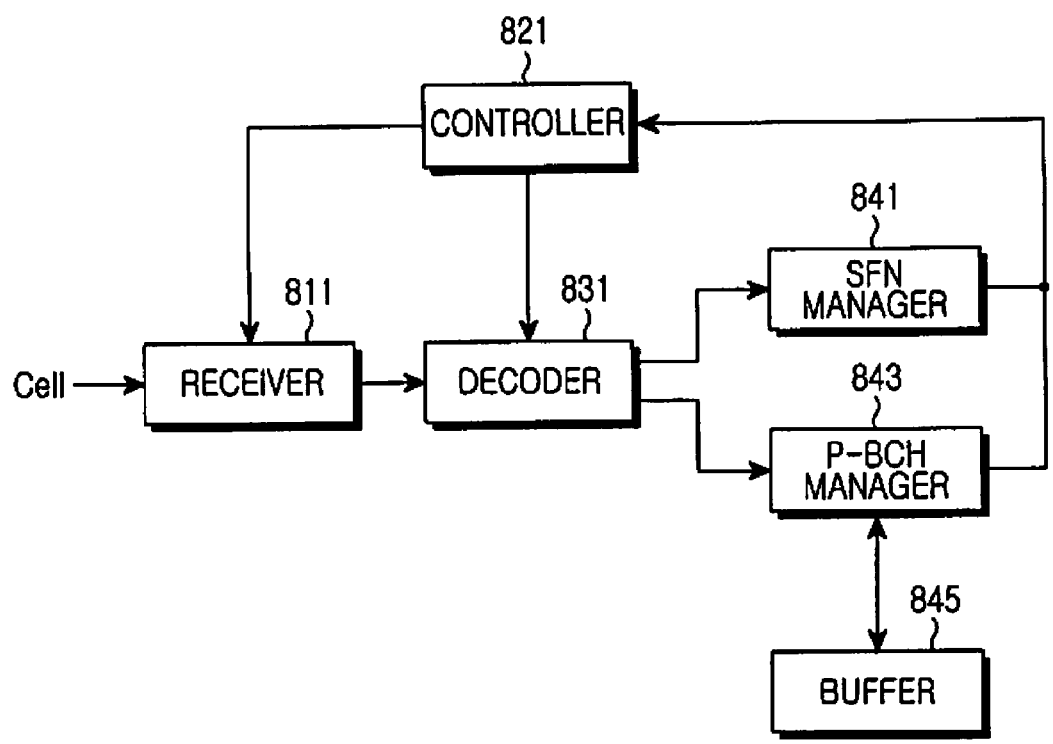
FIG. 8 is a block diagram of a UE apparatus according to the exemplary embodiment of the present invention.

FIG. 8 is a block diagram of a UE apparatus according to the exemplary embodiment of the present invention.

Referring to FIG. 8, a receiver 811 receives system information from a cell. A controller 821 controls the application of a decoding method and a decoding rate to the system information. The controller 821 performs the control operation so that different decoding methods and decoding rates are applied to the SFN and P-BCH information. A decoder 831 decodes the SFN and the P-BCH information under the control of the controller 821 and provides the decoded SFN to an SFN manager 841 and the decoded P-BCH information to a P-BCH manager 843. The SFN manager 841 checks the continuity of received SFNs and according to the result, the SFN manager 841 can additionally receive SFNs in next transmission periods through the controller 821. If the P-BCH information reception failed, the P-BCH manager 843 stores the received P-BCH information in a buffer 845 and combines the stored P-BCH information with P-BCH information received in the next transmission period.

Figure 9:
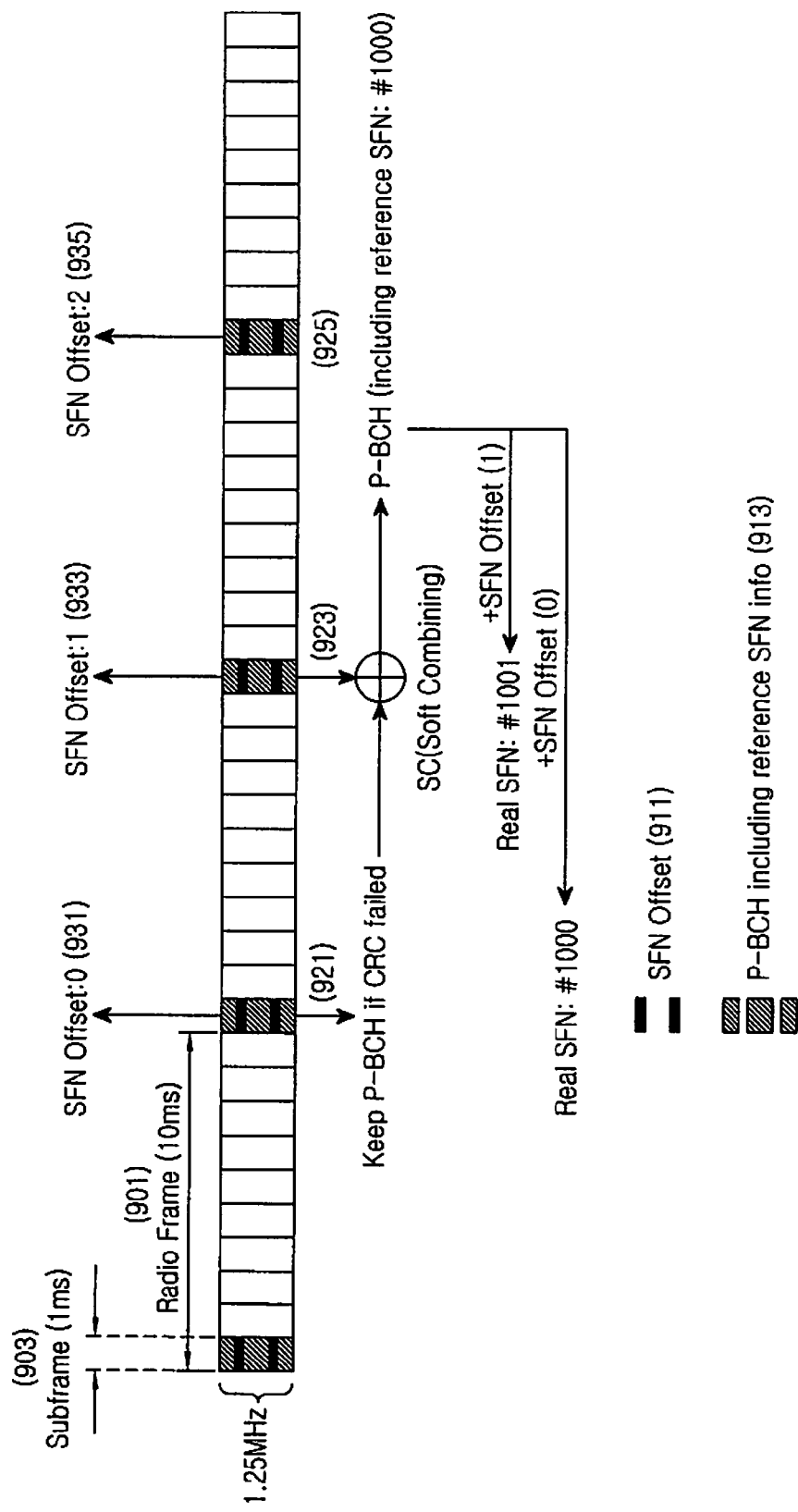
FIG. 9 is a diagram illustrating a method for transmitting system information and a method for receiving the system information in the UE according to another exemplary embodiment of the present invention.

FIG. 9 is a diagram illustrating a method for transmitting system information and a method for receiving the system information in the UE according to another exemplary embodiment of the present invention.

Referring to FIG. 9, it is assumed herein that a 10-ms radio frame 901 includes ten subframes 903 and a P-BCH carries system information in a 1.25-MHz subframe of every radio frame. Reference numeral 911 denotes an SFN offset encoded in a predetermined coding scheme and transmitted in predetermined resources in the 1.25-MHz subframe. The resources can be frequency resources, a scrambling code, or the like. Reference numeral 913 denotes P-BCH information. The P-BCH information 913 is encoded in a different coding scheme/coding rate from that of the SFN offset 911 and transmitted in different resources from those of the SFN offset 911 in the 1.25 MHz subframe. The coding method can be repetition. The P-BCH information 913 includes a reference SFN instead of an actual SFN. The reference SFN is identical during one SFN offset period. The actual SFN is obtained by adding the reference SFN and an SFN offset.

For example, if an actual SFN is #1000 at time 921 and an SFN offset is represented in two bits, the SFN offset is one of {0, 1, 2, 3} and a reference SFN is kept to be #1000 during one SFN offset period. The SFN offset and the reference SFN are carried on the P-BCH. That is, the P-BCH delivers the same reference SFN, SFN #1000, in radio frames having SFN #1000 to SFN #1003, and SNF offsets 0, 1, 2 and 3, respectively, at the transmission times of SFN #1000 to SFN #1003. Since the same reference SFN, SFN #1000 applies to the radio frames SFN #1000 to SFN #1003, the UE can combine P-BCH information received in the radio frames SFN #1000 to SFN #1003. As described before, an actual SFN is calculated by adding a reference SFN and an SFN offset received on the P-BCH in a radio frame.

If the UE receives system information at a P-BCH transmission time 921, the UE acquires an SFN offset 931, SFN offset 0, by decoding and interpreting the system information in predetermined resources of 1.25 MHz (i.e. SFN transmission resources and other P-BCH transmission resources) according to a predetermined method. If the UE fails to receive the P-BCH information 913, that is, the P-BCH information 913 has a CRC error, the UE stores the P-BCH information 913 in a buffer, receives the P-BCH information 913 at the next P-BCH transmission time 923, and combines the stored P-BCH information 913 with the received P-BCH information 913.

The UE receives an SFN offset 933, SFN offset 1 at the P-BCH transmission time 923 and SFN offset 1 is successive to SFN offset 0. Therefore, the UE determines that the SFN offsets have been received without errors. Since the P-BCH information 913 received at the P-BCH transmission times 921 and 923 includes the same reference SFN, the UE can combine the P-BCH information 913.

In the case where an SFN offset received at the current P-BCH transmission time is one SFN offset period away from an SFN offset of the previous P-BCH transmission time, for example, when previous and current 2-bit SFN offsets are 3 and 0, respectively, P-BCH information received at the two P-BCH transmission times cannot be combined. Then, the UE clears its buffer and performs a CRC check on the P-BCH information received at the current P-BCH transmission time without combining. If the CRC check is bad, i.e. turns up errors, the UE stores the P-BCH information in the buffer and can correct the error in the P-BCH information using next-received P-BCH information.

If the SFN offsets received at the P-BCH transmission times 921 and 923 are not successive, the UE cannot determine whether the received P-BCH information is within the same SFN offset period. In this case, the UE performs a CRC check on the P-BCH information received at the P-BCH transmission time 923. If the CRC check is bad, the UE combines the P-BCH information with the P-BCH information received at the P-BCH transmission time 921 and then checks a CRC in the combined P-BCH information. It can be further contemplated that the P-BCH information received at the P-BCH transmission times 921 and 923 are first combined and then CRC-checked, and if the CRC check is bad, the P-BCH information received at the P-BCH transmission time 923 is separately CRC-checked. It can also be further contemplated that the P-BCH information received at the P-BCH transmission times 921 and 923 are combined unconditionally.

If the UE cannot decide as to the continuity of the SFN offsets at any of the P-BCH transmission times 921, 923 and 925, the UE combines P-BCH information received at the next P-BCH transmission time 925 with the P-BCH information received at the P-BCH transmission times 921 and 923 in all possible cases and performs a CRC check on the combined P-BCH information. For example, the UE combines the P-BCH information received at the next P-BCH transmission time 925 with the P-BCH information received at the P-BCH transmission time 921, combines the P-BCH information received at the next P-BCH transmission time 925 with the P-BCH information received at the P-BCH transmission time 923, and performs a CRC check on the combined information in every possible case.

If the P-BCH signal has been successfully received by combining at the P-BCH transmission time 923, the UE obtains the actual SFN, SFN #1000 for the P-NCH transmission time 921 by adding the reference SFN, SFN #1000, included in the P-BCH signal to SFN offset 0 for the P-BCH transmission time 921 and obtains the actual SFN, SFN #1001, for the P-NCH transmission time 923 by adding the reference SFN, SFN #1000, to SFN offset 1 for the P-BCH transmission time 923.

The UE can detect and correct reception errors by checking the continuity of N (N>=2) received SFN offsets. For example, for N=2, if SFN offsets 0 and 1 are received at the P-BCH transmission times 921 and 923, respectively, the UE determines that the SFN information has been successfully received because SFN offsets 0 and 1 are successive. In the same manner, for N=3, if SFN offsets 0, 2 and 2 are received at the P-BCH transmission times 921, 923 and 925, respectively, the UE determines that SFN offset 2 received at the P-BCH transmission time 923 is wrong and corrects this SFN offset to 1 using the previous and next SFN offsets.

While not shown, the UE can combine P-BCH information over every possible case (blind combining) and detect SFN offsets according to the combining results. For example, if a 1-bit SFN offset is used and the UE cannot decide as to the continuity of SFN offsets, the UE performs blind combining. If a CRC error is not detected from a certain combining case, the SFN offsets of two successive pieces of P-BCH information in the successful combining case are 0 and 1, sequentially. That is, if SFN offsets are represented in one bit, the P-BCH information received at the P-BCH transmission times 921, 923 and 925 is combined in every possible case. If no CRC error is found in the combination of the P-BCH information received at the P-BCH transmission times 923 and 925, the SFN offsets of the P-BCH transmission times 923 and 925 are 0 and 1, sequentially.

Figure 10:
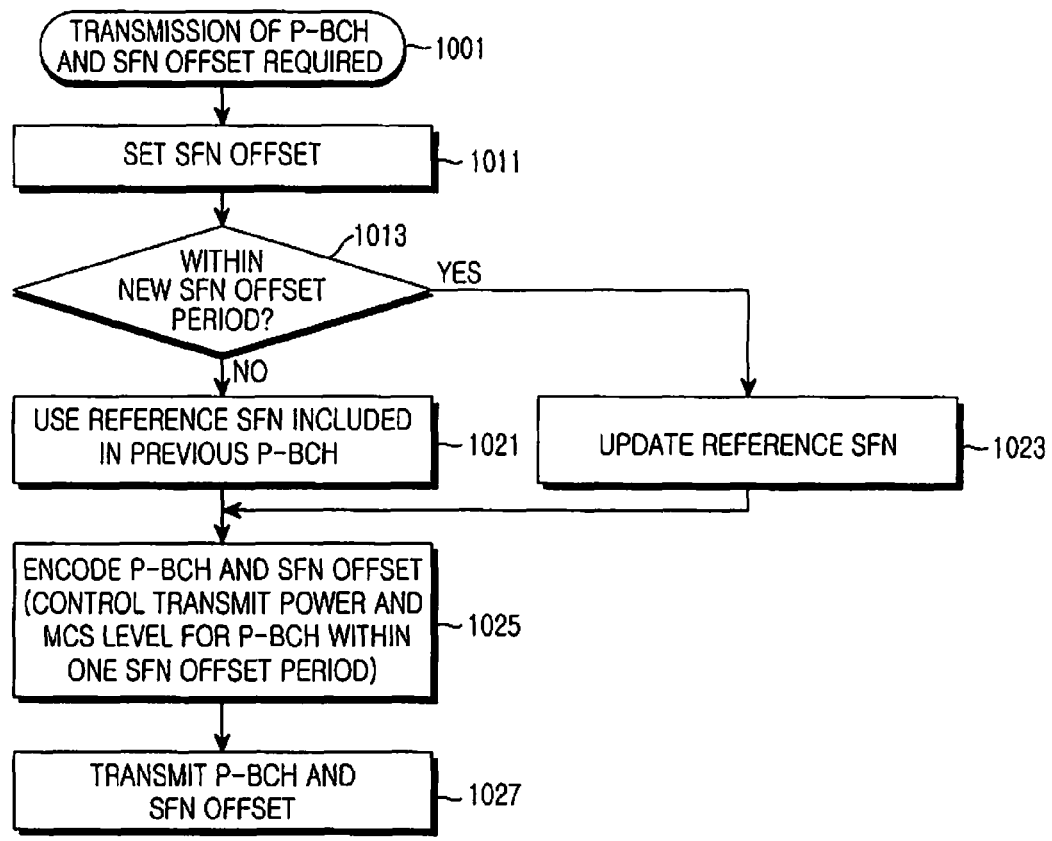
FIG. 10 is a flowchart of an operation of the ENB according to the second exemplary embodiment of the present invention.

FIG. 10 is a flowchart of an operation of the ENB according to the second exemplary embodiment of the present invention.

Referring to FIG. 10, when determining to transmit P-BCH information and an SFN offset in step 1001, the ENB sets the SFN offset in step 1011. For example, if the SFN offset is represented in two bits, the ENB can set the SFN offset mapped to an actual SFN by (SFN mod 4). In step 1013, the ENB determines whether the SFN offset is within one SFN offset period. For example, if an SFN offset is 2 bits and set to be one of 0, 1, 2, 3, and 0, an SFN offset set to the second 0 is outside one SFN offset period. That is, one SFN offset period is a period for which SFN offsets are set to 0, 1, 2 and 3, sequentially.

If the SFN offset is within one SFN offset period in step 1013, the ENB still uses a reference SFN included in P-BCH information transmitted at the previous P-BCH transmission time in step 1021. The reference SFN is set to a value resulting from subtracting the SFN offset from an actual SFN. If the SFN offset is outside one SFN offset period in step 1013, the ENB updates in step 1023 the reference SFN to be included in a P-BCH signal and in step 1025 encodes the P-BCH and the SFN offset in predetermined coding methods. Herein, transmit power or an MCS level is controlled for P-BCH information including the reference SFN corresponding to the SFN offset within one SFN offset period, under the assumption that the UE combines the P-BCH information. For example, the ENB uses a low transmit power level or an MCS level with a high coding rate for the P-BCH information. In step 1027, the ENB transmits the P-BCH information and the SFN offset in predetermined respective resources.

Figure 11:
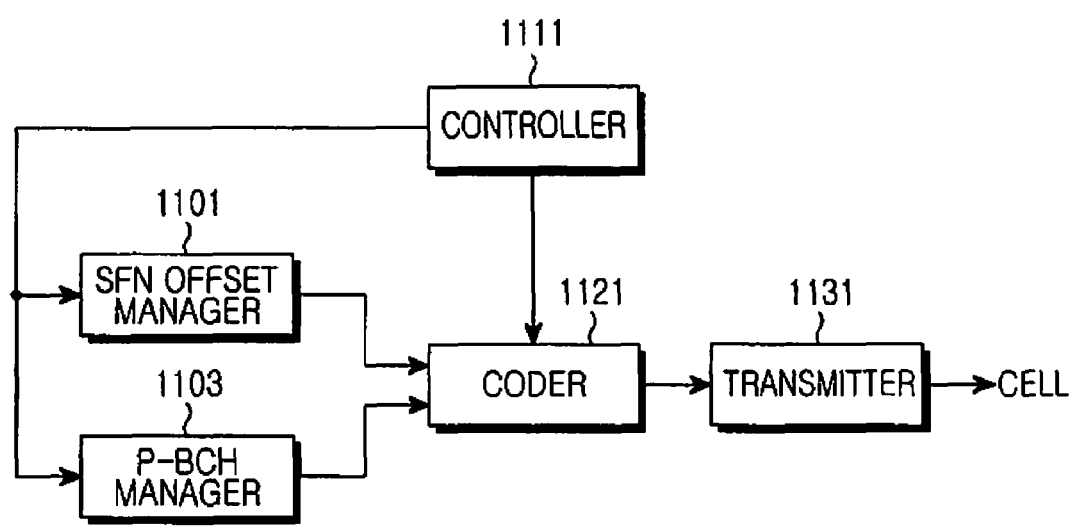
FIG. 11 is a block diagram of an ENB apparatus according to the second exemplary embodiment of the present invention.

FIG. 11 is a block diagram of an ENB apparatus according to the second exemplary embodiment of the present invention.

Referring to FIG. 11, the ENB apparatus has the same configuration as that illustrated in FIG. 6 according to the first exemplary embodiment of the present invention, except for an SFN offset manager 1101. The SFN offset manager 1101 sets and manages SFN offsets. The SFN offsets are set to {SFN mod $2^{(number\ of\ bits\ allocated\ to\ SFN\ offset)}$} A controller 1111 updates a reference SFN included in P-BCH information from a P-BCH information manager 1103 according to an SFN offset set by the SFN offset manager 1101, when needed. A coder 1121 encodes the SFN offset and P-BCH information in predetermined coding methods/coding rates.

Figure 12A:
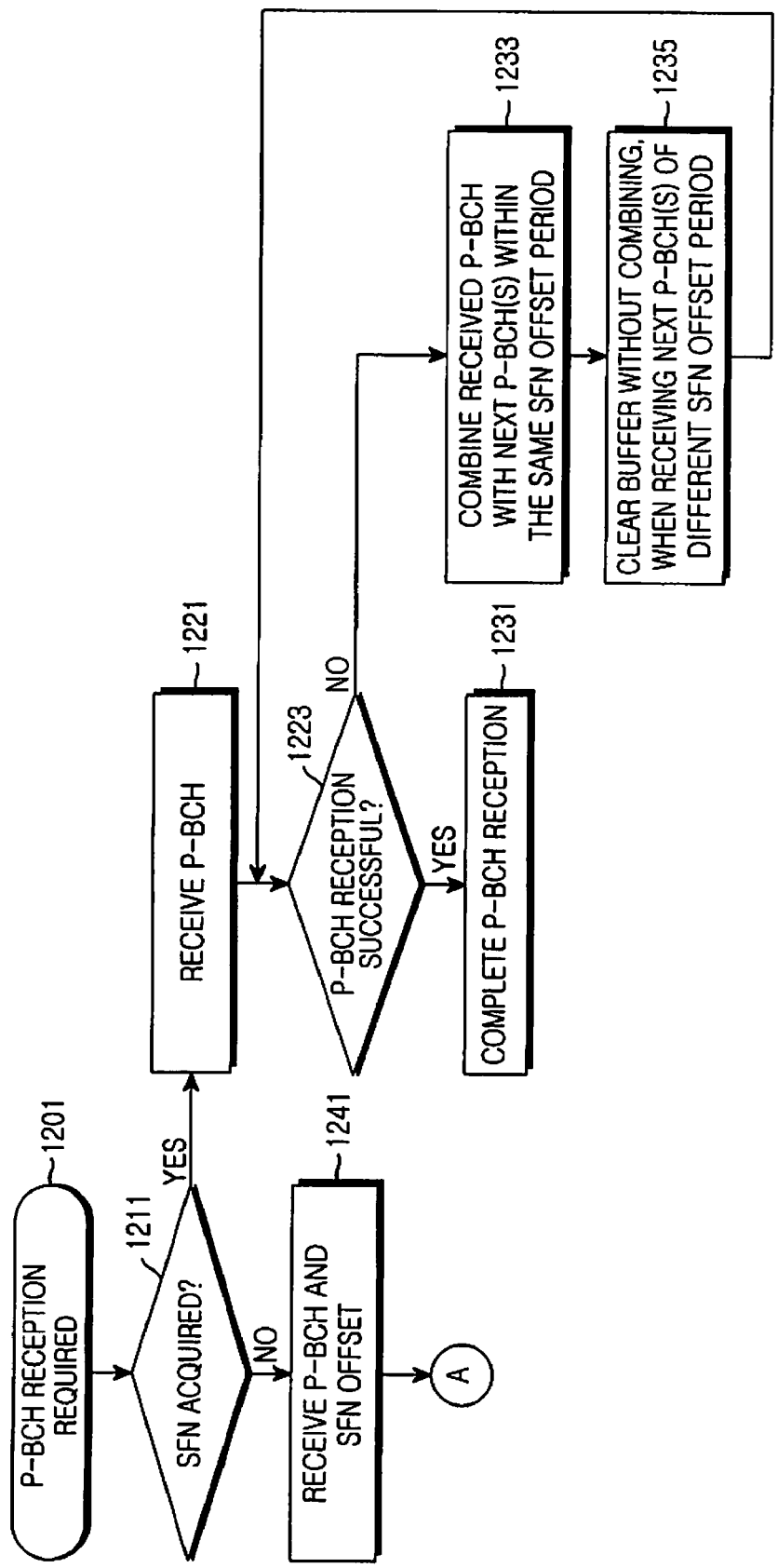
FIGS. 12A and 12B are a flowchart of an operation of the UE according to the second exemplary embodiment of the present invention.
Figure 12B:
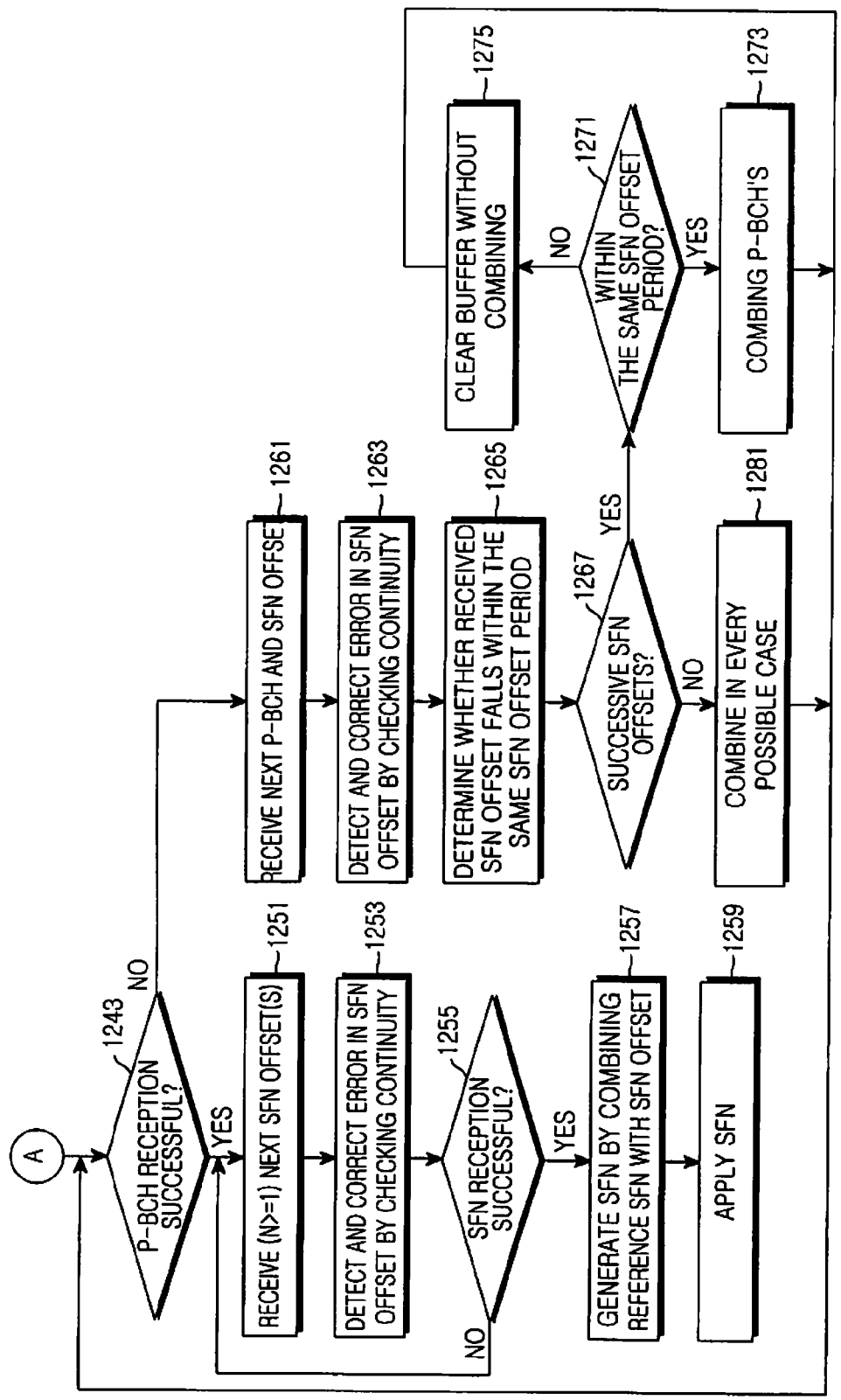

FIGS. 12A and 12B are a flowchart of an operation of the UE according to the second exemplary embodiment of the present invention.

Referring to FIGS. 12A and 12B, when determining that P-BCH information needs to be received in step 1201, the UE determines in step 1211 whether SFN information of a serving cell has already been acquired. If the SFN information has not been acquired, the UE in step 1241 receives an SFN offset and P-BCH information in predetermined respective resources using predetermined respective coding methods/coding rates. In step 1243, the UE checks whether the P-BCH information has a CRC error. If the P-BCH information has been successfully received without the CRC error, the UE receives in step 1251 N SFN offsets (N>=1) in next P-BCH transmission periods, and in step 1253 detects and corrects SFN offset reception errors by checking the continuity of the received SFN offsets. For example, for N=1, if the SFN offset received in step 1241 is 0 and the SFN offset received in step 1251 is 1, the UE determines that the SFN offset information has been successfully acquired because the SFN offsets are successive. For N=2, if the SFN offset received in step 1241 is 0 and the SFN offsets received in step 1251 are 3 and 2, the UE determines that SFN offset 3 is wrong and corrects this SFN offset to 1.

In step 1255, the UE checks the continuity of the SFN offsets corrected in step 1253 and determines whether the SFN offset information has been successfully acquired. If the SFN offsets are successive, the UIE goes to step 1259, considering that the SFN offset information has been successfully acquired in step 1255. If in step 1255 it is determined that the SFN offset information acquisition failed, the UE returns to step 1251 and repeats 1251 to 1255.

In step 1257, the UE generates actual SFNs by combining a reference SFN included in the P-BCH information with the respective SFN offsets in step 1257 and in step 1259 applies the actual SFNs, considering that acquisition of SFN information of the cell has been completed.

If in step 1243 it is determined that a CRC error has occurred in the P-BCH information, in step 1261 the UE receives a new SFN offset and P-BCH information in the next transmission period. In step 1263, the UE detects reception errors by checking the continuity of SFN offsets including the new SFN offset and if a reception error is detected, the UE corrects it. The UE determines whether the SFN offset received in step 1261 and corrected in step 1263 is within the same SFN offset period as an SFN offset received in the previous P-BCH transmission period in step 1265. In step 1267, the UE determines whether the received or corrected SFN offsets are successive in step 1267. If the SFN offsets are not successive, the UE combines P-BCH information for every possible case (blind combining) in step 1281. Every possible combing case may include the case of no combining. If the SFN offsets are successive in step 1267, the UE in step 1271 determines whether the successive SFN offsets are within the same SFN offset period. If they are within the same SFN offset period, the UE in step 1273 combines the P-BCH information received in step 1261 with at least one piece of previously received P-BCH information. If the SFN offsets are within the same SFN offset period in step 1271, the UE in step 1275 clears the buffer without combining. After step 1281, 1273, or 1275, the UE returns to step 1243.

If the UE has already acquired the SFN information of the cell in step 1211, the UE in step 1221 receives P-BCH information in predetermined resources using a predetermined coding method and determines in step 1223 whether the P-BCH information has been successfully received without a CRC error. If a CRC has occurred and the P-BCH information reception failed, the UE combines in step 1233 the P-BCH information with at least one piece of next P-BCH information whose SFN offsets are within the same SFN offset period. If the UE receives P-BCH information whose SFN offset does not fall within the same SFN offset period, in step 1235 the UE clears the buffer without combining the P-BCH information. After step 1235, the UE returns to step 1223.

Figure 13:
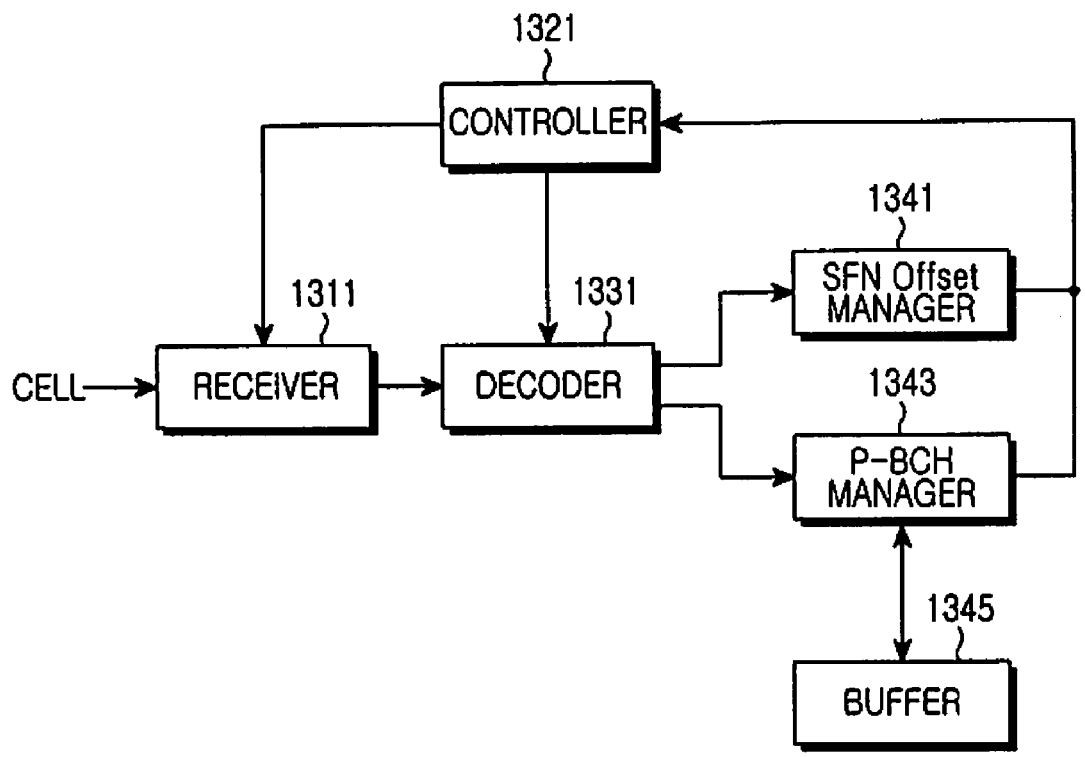
FIG. 13 is a block diagram of a UE apparatus according to the second exemplary embodiment of the present invention.

FIG. 13 is a block diagram of a UE apparatus according to the second exemplary embodiment of the present invention.

Referring to FIG. 13, the UE apparatus has the same configuration as that illustrated in FIG. 8 according to the first exemplary embodiment of the present invention, except for an SFN offset manager 1341. A receiver 1311 receives P-BCH information and an SFN offset from a cell. A controller 1321 controls a decoder 1331 to decode the SFN offset and the P-BCH information in predetermined respective decoding methods. The decoded SFN offset and the decoded P-BCH information are provided to the SFN offset manager 1241 and a P-BCH manager 1343, respectively. The SFN offset manager 1341 checks the continuity of decoded SFN offsets and according to the result. The SFN offset manager 1341 can additionally receive SFN offsets at next transmission times through the controller 1321. If the P-BCH information reception failed, the P-BCH manager 1343 stores the received P-BCH information in a buffer 1345 and combines the stored P-BCH information with at least one piece of P-BCH information within the same SFN offset period, received through the SFN offset manager 1341 and the controller 1321. An SFN offset can be transmitted on a physical channel after repetition. The repetition is considered as a kind of coding. In FIG. 13, for the sake of convenience, it is assumed that the decoder 1331 also interprets the SFN offset which was repeated.

As is apparent from the above description, the present invention advantageously enables more P-BCH information bits in a given bandwidth in a cell.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting system information in a mobile communication system, comprising:
   transmitting first system information and second system information in each first subframe of each radio frame,
   wherein the second system information includes variable values in each radio frame of a predetermined system information transmission period, which corresponds to N successive radio frames, where N is a positive integer greater than zero,
   wherein the first system information includes an identical value during the predetermined system information transmission period,
   wherein the first system information includes a reference System Frame Number (SFN), and the second system information includes an SFN offset, and
   wherein the reference SFN is combined with the SFN offset to generate an SFN.

2. The method of claim 1, wherein the N=4 and the SFN offset is two bits.

3. The method of claim 1, wherein the first system information is transmitted with at least one of a bandwidth of the cell, a Cyclic Prefix (CP) length, a physical channel configuration, and a number of transmit antennas.

4. A Node B apparatus for transmitting system information in a mobile communication system, comprising:
   a coder for encoding first system information; and
   a transmitter for transmitting the first system information and second system information in each first subframe of each radio frame,
   wherein the second system information includes variable values in each radio frame of a predetermined system information transmission period, which corresponds to N successive radio frames, where N is a positive integer greater than zero,
   wherein the first system information includes an identical value during the predetermined system information transmission period,
   wherein the first system information includes a reference System Frame Number (SFN), and the second system information includes an SFN offset, and
   wherein the reference SFN is combined with the SFN offset to generate an SFN.

5. The Node B apparatus of claim 4, wherein the N=4 and the SFN offset is two bits.

6. The Node B apparatus of claim 4, wherein the first system information comprises at least one of:
   a bandwidth of the cell;
   a Cyclic Prefix (CP) length;
   a physical channel configuration; and
   a number of transmit antennas.

7. A method for receiving system information in a mobile communication system, comprising:
   receiving first system information and second system information in each first subframe of each radio frame,
   wherein the second system information includes variable values in each radio frame of a predetermined system information transmission period, which corresponds to N successive radio frames, where N is a positive integer greater than zero,
   wherein the first system information includes an identical value during the predetermined system information transmission period,
   wherein the first system information includes a reference System Frame Number (SFN), and the second system information includes an SFN offset, and
   wherein the reference SFN is combined with the SFN offset to generate an SFN.

8. The method of claim 7, wherein the N=4 and the SFN offset is two bits.

9. The method of claim 7, wherein the first system information is received with at least one of a bandwidth of the cell, a Cyclic Prefix (CP) length, a physical channel configuration, and a number of transmit antennas.

10. A User Equipment (UE) apparatus for receiving system information in a mobile communication system, comprising:
    a receiver for receiving first system information and second system information in each first subframe of each radio frame,
    a decoder for decoding the first system information; and
    a controller for controlling decoding methods and decoding rates for the decoder,
    wherein the second system information includes variable values in each radio frame of a predetermined s stem information transmission period which corresponds to N successive radio frames, where N is a positive integer greater than zero,
    wherein the first system information includes an identical value during the predetermined system information transmission period,
    wherein the first system information includes a reference System Frame Number (SFN), and the second system information includes an SFN offset, and
    wherein the reference SFN is combined with the SFN offset to generate an SFN.

11. The UE apparatus of claim 10, wherein the N=4 and the SFN offset is two bits.

12. The UE apparatus of claim 10, wherein the first system information comprises at least one of:
    a bandwidth of the cell;
    a Cyclic Prefix (CP) length;
    a physical channel configuration; and
    a number of transmit antennas.

* * * * *